United States Patent [19]
Anderson

[11] 3,859,668
[45] Jan. 14, 1975

[54] ROTATABLE SUTURING MEMBER

[75] Inventor: Lawrence Anderson, Minneapolis, Minn.

[73] Assignee: Medical Incorporated, Minneapolis, Minn.

[22] Filed: Oct. 9, 1973

[21] Appl. No.: 404,516

Related U.S. Application Data

[60] Division of Ser. No. 279,936, Aug. 11, 1972, Pat. No. 3,781,969, which is a continuation-in-part of Ser. No. 235,502, March 17, 1972, Pat. No. 3,763,548.

[52] U.S. Cl.................................... 3/1, 3/DIG. 3
[51] Int. Cl. ................................................ A61f 1/22
[58] Field of Search............................. 3/1, DIG. 3

[56] References Cited
UNITED STATES PATENTS

| | | | |
|---|---|---|---|
| 3,365,728 | 1/1968 | Edwards et al. | 3/1 |
| 3,491,376 | 1/1970 | Shiley | 3/1 |
| 3,623,212 | 11/1971 | Child | 3/1 X |
| 3,737,919 | 6/1973 | Child | 3/1 |

*Primary Examiner*—Ronald L. Frinks

[57] ABSTRACT

A suturing member and method of forming the suturing member on an implantable device, as a heart valve. The suturing member has a porous fabric cover surrounding a semi-rigid plastic core. An annular sleeve of heat shrinkable plastic material located within the cover holds the cover in assembled relation with the device in a manner which allows for rotation of the device after the suturing member has been attached to the heart tissue. In the method of forming and mounting the suturing member on the device, the suturing member is shaped and cured on the device with the use of a mold. The mold is heated to cure the plastic core of the suturing member and bond the core to the inner surface of the cover.

21 Claims, 16 Drawing Figures

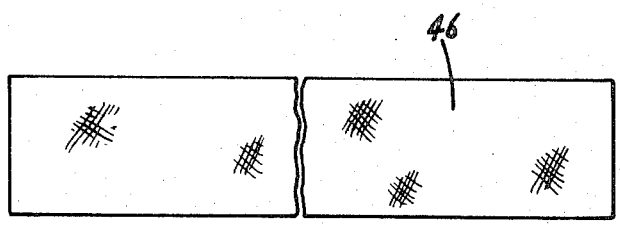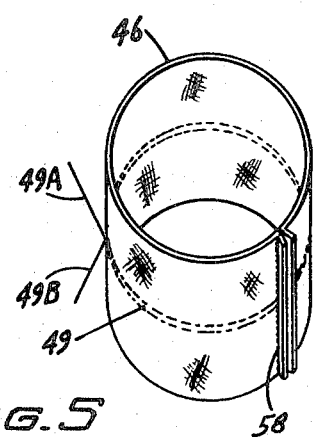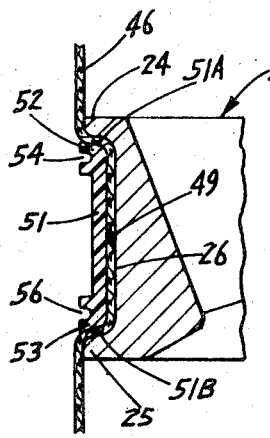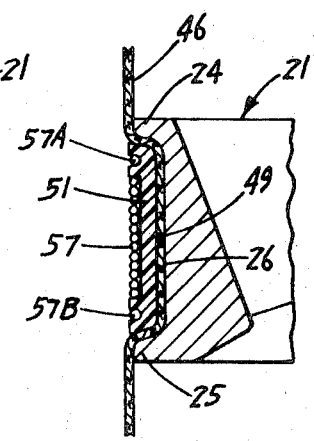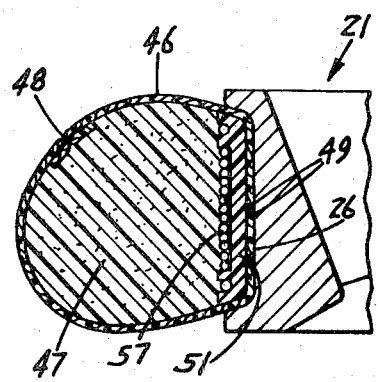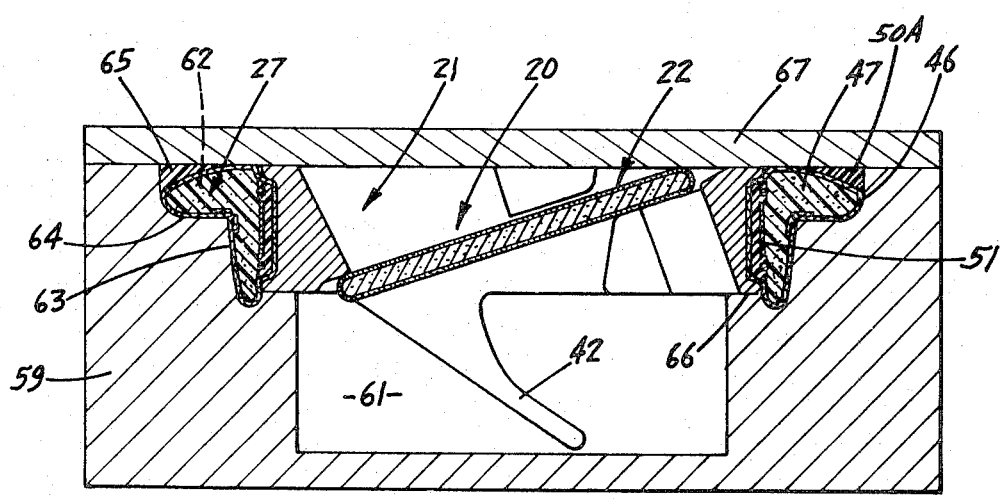

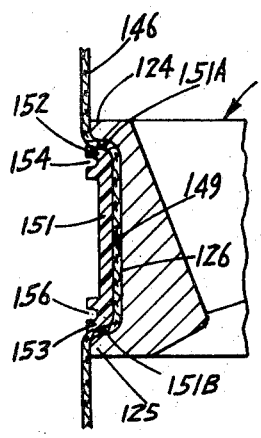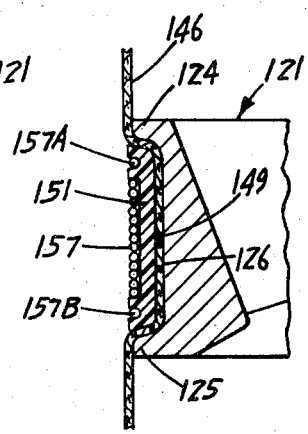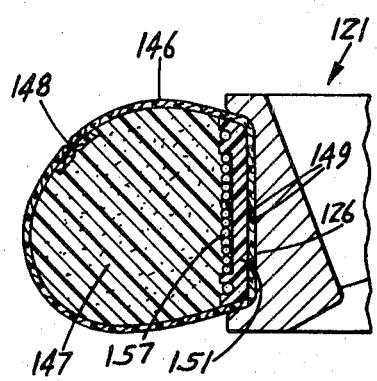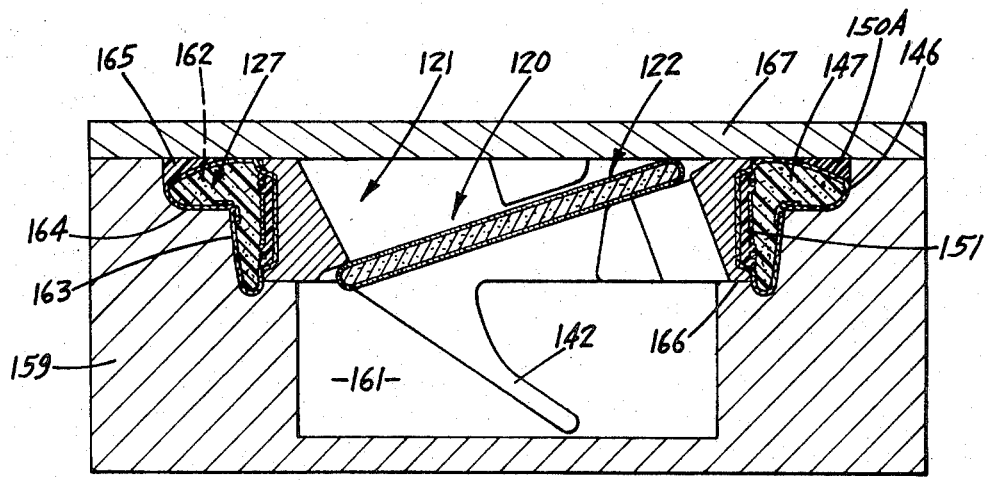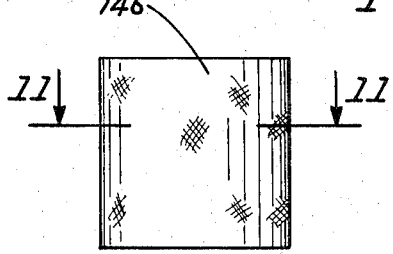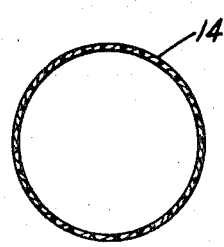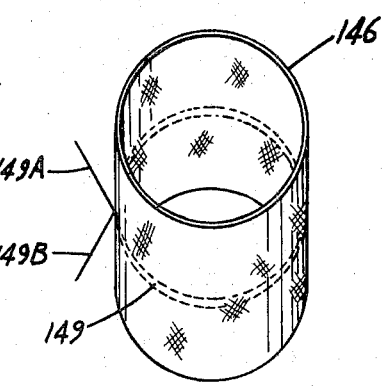

3,859,668

ROTATABLE SUTURING MEMBER

CROSS REFERENCE TO RELATED APPLICATION:

This application is a division of U.S. application Ser. No. 279,936 filed Aug. 11, 1972, now U.S. Pat. No. 3,781,969. Application Ser. No. 279,936 is a continuation-in-part of U.S. application Ser. No. 235,502, filed Mar. 17, 1972, now U.S. Pat. No. 3,763,548.

BACKGROUND OF THE INVENTION

Clinical uses of prosthetic devices having suturing members for attaching the devices to tissue show that it is advantageous to move the device relative to the suturing member after the suturing member has been connected to the tissue. Pivoting disc valves, as disclosed by Kaster in U.S. Pat. No. 3,476,143, have valving discs that angularly move to open and closed positions. During the implanting procedure, it is often desirable to adjust the angular position of the valve after it has been implanted. The base of the valve is rotated relative to the suturing member secured to the heart tissue to orientate the disc away from calcifications that could interfere with the free movement of the disc. The valve base is rotated relative to the suturing member with a holder or handle used to position the valve during the implant procedure. Heretofore, in order to permit angular orientation of the valve after implanting, the suturing member was provided with a relatively loose fit on the valve base. This loose relationship between the suturing member and the valve base is undesirable as in use the valve may shift or slide relative to the suturing member and blood could accumulate and stagnate adjacent the valve.

Suturing members are retained on the heart valve in a number of ways. A clamp ring and wire is disclosed in U.S. Pat. No. 3,099,016 to hold the sewing ring on the valve base. Stainless steel and plastic rings encased in porous material are used in U.S. Pat. No. 3,396,409 to hold the porous material on the base of the heart valve. Child in U.S. Pat. No. 3,623,212 discloses a suturing member for implantable devices and a method of making the suturing member on the device. The cover is held on the valve base with a plurality of cords or threads. The threads are would in a relatively close and tight relationship and prevent effective rotation of the valve base relative to the suturing member once the threads are tied. The cords do not provide for substantially even holding force across the entire width of the suturing member, whereby portions of the suturing member can separate from the valve base.

SUMMARY OF THE INVENTION

The invention is directed to a suturing member for implantable devices, as heart valves, and a method of making the suturing member on the device. The suturing member is an annular sewing ring or collar that is mounted on the device in a manner that allows for rotation of the device after the suturing member has been attached to the tissue. The suturing member has a cover of biologically inert porous material for accommodating live tissue ingrowth, or fibrosis, between the tissue and the porous material. The cover surrounds a core of plastic material bonded to the inner surface of the cover to confine body fluids and blood to the cover. Located within the cover is an annular sleeve or tubular member of heat shrinkable plastic material. The sleeve is heat shrunk to provide a uniform contraction force to hold the suturing member on the device. A plurality of cords surround the sleeve to insure that the entire width of the sleeve holds the cover in full engagement with the device. The suturing member is formed or made on the device by holding a cylindrical fabric cover on the device with the annular sleeve. The cover can be a seamless cylindrical fabric. After the sleeve is heat shrunk the cords are wound around the sleeve. The plastic material is then enclosed in the cover. The suturing member is then shaped and heat cured in a mold. During heat curing of the core, the sleeve is further heat shrunk and the core is bonded to the inside of the cover.

An object of the invention is to provide an implantable device with a suturing member that permits movement of the device after the suturing member has been attached to the tissue. Another object of the invention is to provide a suturing member that does not separate from the device, but at the same time will permit rotation of the device relative to the suturing member. A further object of the invention is to provide a method of making a suturing member on a device which uniformly holds the suturing member on the device and bonds the core material to the cover of the suturing member. Still another object of the invention is to provide a suturing member which can be formed on a device in a variety of shapes and which can be universally applied to many types of implantable devices.

IN THE DRAWINGS

FIG. 4 is a plan view of a blank of the fabric cover of the suturing member;

FIG. 5 is a perspective view of the fabric cover in cylindrical form;

FIG. 6 is a sectional view of part of the valve base showing the cover and heat shrunk sleeve surrounding the cover;

FIG. 7 is a sectional view similar to FIG. 6 showing the cords wound around the sleeve;

FIG. 8 is a sectional view similar to FIG. 7 showing the plastic core material enclosed within the cover;

FIG. 9 is a sectional view of the valve and suturing member located in a shaping and curing mold;

FIG. 10 is a side elevational view of a cylindrical seamless fabric cover used in a modified suturing member of the invention;

FIG. 11 is a section view taken along line 11—11 of FIG. 10;

FIG. 12 is a perspective view of the seamless fabric cover;

FIG. 13 is a sectional view of part of the valve base showing the cover and heat shrunk sleeve surrounding the cover;

FIG. 14 is a sectional view similar to FIG. 13 showing the cords wound around the sleeve;

Figure 1:
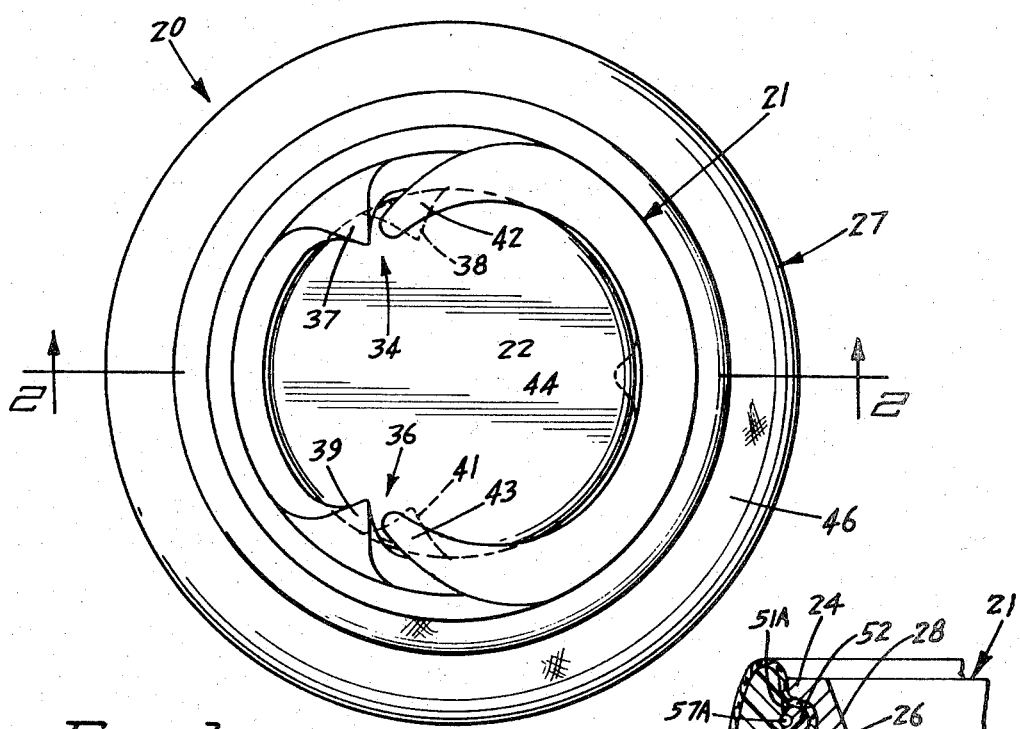
FIG. 1 is a proximal plan view of a heart valve in assembled relation with the suturing member of the invention.
Figure 3:
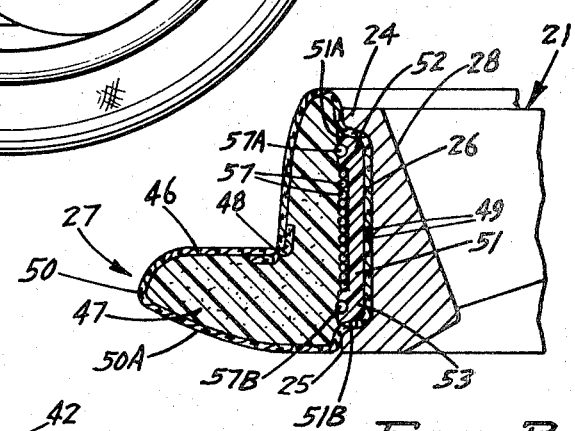
FIG. 3 is an enlarged sectional view of a part of the valve base and suturing member.
Figure 2:
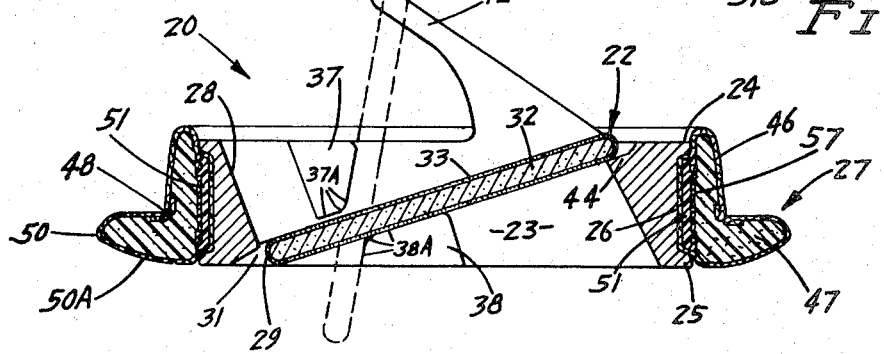
FIG. 2 is a sectional view taken along the line 2—2 of FIG. 1.

FIG. 15 is a sectional view similar to FIG. 14 showing the plastic core material enclosed within the cover; and FIG. 16 is a sectional view of the valve and suturing member located in a shaping and curing mold. Referring to the drawings, there is shown in FIGS. 1 through 3 an implantable device, indicated generally at 20, for controlling the flow of a fluid. Device 20 is a heart valve adapted for use in a human heart. Other types of implantable device can be used with the suturing member of the invention. The following description is limited to a pivoting disc heart valve having the suturing member of the invention. Device 20 has a base or annular housing 21 associated with a free floating disc or occluder 22 to control the flow of blood through valve passageway 23. Disc 22 is a valving member that angularly moves from a closed position, shown in full lines in FIG. 2, to an open position, shown in broken lines, and back to the closed position in response to differential blood pressures on opposite sides of the valve.

Disc 22 is retained in a free floating relationship with the base whereby it is free to rotate about its center and has limited lateral shifting movement as it angularly moves between its open and closed positions. The disc pivots about an off-center or eccentric axis with respect to the diameter of the disc whereby, when the disc is in the open position, there is substantially unrestricted central flow of blood through the valve passageway 23. When disc 22 is in its open position, separate portions of the disc extend above and below the valve base. Valve housing 21 is an annular member having annular outwardly directed upper and lower flanges 24 and 25, respectively. A circular cylindrical outside wall 26 extends between flanges 24 and 25 and forms therewith an outwardly open groove for accomodating a sewing ring or suturing member, indicated generally at 27. Wall 26 has a slight outwardly diverging taper in the direction of the flow of blood through the passageway 23. Preferably the taper is 6°, the inside face of flange 24 is 30° and the inside face of flange 25 is 25° relative to the longitudinal axis of passageway 23. Other angles and size relationship between flanges 24 and 25 and wall 26 can be used. Suturing member 27 provides structure for receiving sutures used to attach the valve to the heart tissue. Suture member 27 is mounted on valve housing 21 in a manner so that the housing can be rotated relative to the suturing member after the suturing member has been attached to the heart tissue. This permits the surgeon to adjust the angular position of the valve disc after it has been implanted. Disc 22 can be orientated away from calcifications which may interfere with the free movement of the disc.

Valve housing 21 has an inside wall 28 surrounding the passageway 23 to the housing. Disc 22 has an uninterrupted outer peripheral edge 29 which cooperates with inside wall 28 when the disc is in the closed position to substantially block reverse flow of blood through passageway 23. The diameter of disc 22 is slightly smaller than the diameter of opening 23. This leaves a small annular space 31 between the outer peripheral edge 29 and the adjacent circumferential portion of the inside wall 28 of the valve housing. This space 31 permits limited reverse or retrograde flow of blood through the valve opening 23 when the disc 22 is in the closed position. Retrograde flow of blood prevents stagnation of blood in pockets or pools since the blood is continuously moving through the passageway 23.

Disc 22 has a circular configuration with generally flat upper and lower sides which are joined by the uninterrupted outer peripheral edge. The disc has a substrate 32 covered with a skin or coating 33. Coating 33 is a hard, biologically inert, wear resistant material such as pyrolytic carbon.

A first pair of pivot means indicated generally at 34 and a second pair of pivot means indicated generally at 36 cooperate with the disc to control its pivotal movement and limit its open and closed positions. The pairs of pivot members provide disc 22 with a pivot axis that is offset from the diameter of the disc so that when the disc is in the open position there is free central flow of blood through passageway 23. The pivot axis of the disc generally follows an imaginary chord line approximately an equal distance between the center of passageway 23 and the portion of wall 28 measured along a transverse diametrical line. The pivotal axis of the disc 22 will vary or shift relative to the center of the disc during the opening and closing episodes of the disc since the disc is free for limited movement in its plane.

The first pair of pivot means 34 comprise an upper, or distal, pivot 37 and a lower, or proximal, pivot 38 located adjacent opposite circumferential portions of the disc 22 and projected into passageway 23. The second pair of pivots comprise an upper, or distal, pivot 39 and a lower, or proximal, pivot 41 located adjacent opposite portions of the disc and extended into passage 23. The pivots 37, 38 and 39, 41 are pairs of projections, elements or legs having surfaces which function as fulcrums and stops for the disc during its opening and closing movements. As shown in FIG. 2, the pivot 37 has fulcrum surfaces 37A engageable with the disc during the opening episode of the disc. Pivot member 38 has fulcrum surfaces 38A which engage the disc during the closing episode of the disc. The fulcrum surfaces of the pivots cooperate with separate portions of the disc 22 to define the pivoting and free floating movement of the disc 22.

Disc 22 is retained in assembled relation with the valve housing 21 with a pair of upwardly and forwardly projected arms 42 and 43. Arms 42 and 43 have inwardly facing guide surfaces which provide a path of movement for the disc during its opening and closing movements. The arms project upwardly in the direction of the pivotal movement of the disc and have outer ends that are turned inwardly to prevent escape of the disc when it is in its open position, as shown in broken lines in FIG. 2.

When the disc is in its closed position, it rests on the upper fulcrum surfaces of the proximal pivots 38 and 41 and an abutment or stop 44. As shown in FIG. 1, stop 44 extends inwardly into passageway 23 and is located approximately midway between the pivots 38 and 41. The disc, when in the closed position, is inclined at an angle relative to the longitudinal axis of passageway 23. Preferably, the angle is approximately 18° with respect to a transverse plane normal to the longitudinal axis of passageway 23. When the disc is in the open position, it is inclined approximately 75 to 80° with respect to the transverse plane.

Referring to FIG. 3, the suturing member 27 has a cover 46 of woven porous material made of synthetic fibers, as "Teflon" or "Dacron" cloth. The material of cover 46 is biologically inert and does not deteriorate with time. Cover 46 preferably is an interlaced or knitted fabric having a mesh or spaces into which living tissue grows to form a permanent union between the suturing member and the tissue independent of the sutures applied by the surgeon. Cover 46 surrounds a core 47 of semi-rigid plastic material. Core 47 is a pliable plastic in the uncured state which is compatible with human tissue and body fluids. Furthermore, core 47 is sterilizable, biologically inert, non-irritating and non-toxic to body fluids and tissues. On curing of the plastic core material with heat, a bond is achieved between the inside surface of the cover and the plastic to eliminate all pockets or separations of the cover from the plastic core which could collect blood and other body fluids. The core material preferably is a plastic, such as Dow-Corning "Silastic," fluorosilicone rubber, or a similar synthetic resinous plastic material. This core material cures at a relatively low temperature to a semi-rigid, non-elastic plastic which retains its molded shape. The mold determines the ultimate shape of the suturing member, so that both mitral and aortic suturing members can be made with different shaped molds. Suturing member 27 has a mitral configuration with an outwardly extended flange 50. The proximal side of flange 50 has an upwardly curved suface 50A, as viewed in FIGS. 2 and 3. The thickness of flange 50 decreases toward the outer peripheral edge making the outer section of flange 50 more flexible and easier to suture.

As shown in FIG. 3, the end sections of the cover 46 are secured together with a stitch 48. The ends of cover 46 are turned inwardly so that the outside surface of the cover is smooth. Cover 46, being porous, permits tissue ingrowth so that in time the suturing member will be firmly attached to the heart tissue.

Cover 46 has running or box stitches 49 in the portion adjacent the outside wall 26 of the valve housing. The ends of the thread forming the stitches 49 are knotted together to insure that cover 46 is secure on the valve housing. A continuous, circular sleeve 51 is located between core 47 and a portion of the cover adjacent the outside wall 26 of the housing. Sleeve 51 is a tubular member or ring of heat shrinkable material, as Teflon. Sleeve 51 has a width which substantially fills the groove in the valve housing between flanges 24 and 25. The upper and lower portions of sleeve 51 have enlarged annular end beads 52 and 53. Beads 52 and 53 have outwardly open and continuous grooves 54 and 56 respectively. The top edge 51A of bead 52 has outwardly and upwardly directed taper which substantially follows the slope of the inside surface of flange 24. Bead 53 has a lower edge 51B that has a taper which substantially follows the slope of the inside of flange 25. The heat shrunk plastic sleeve 51 provides uniform contracting and holding forces which allows rotation of the valve base relative to the suturing member 27.

A row of threads or surgical string wrapped around sleeve 51 extends between beads 52 and 53. A thread 57A is located in groove 54 of bead 52. In a similar manner, thread 57B is located in groove 56 of bead 53. When threads 57A and 57B are tightened, they insure that cover 46 will remain in close fitting relationship with respect to the inner surfaces of flanges 24 and 25.

Referring to FIGS. 4 through 9, there is shown a method of making and assembling suturing member 27 on valve housing 21. As shown in FIG. 4, cover 46 is cut into a rectangular shape of a selected size, depending on the size of the valve housing. For example, the cover material for an aortic valve can range from 72 mm × 16 mm to 108 mm × 26 mm and the material for a mitral valve can range from 72 × 18 mm to 110 × 26 mm. Preferably, the fabric is cut on a bias at a 45° angle. The fabric is then formed into a cylinder or tube, as shown in FIG. 5. The adjacent ends of the cover 46 are stitched together with stitches 58, with the ends projected in an outward direction. Double box stitches 49 are placed through the mid-portion of the cylindrical cover 46, with ends 49A and 49B extended on the outside of the cover.

Referring to FIG. 6, the cover 46 is then placed about the valve housing 21. The mid-portion of cover 46 carrying stitches 49 is located approximately at the midpoint of outside wall 26. The ends 49A and 49B are pulled and tied together. Sleeve 51 is then slipped over the cover and located in the groove between flanges 24 and 25. The plastic sleeve 51 has a pre-shrunk size when it is placed over the cover 46. Sleeve 51 is a tubular member that is initially pre-shrunk on a cylindrical mandrel to a selected diameter. After the sleeve has been shrunk on the mandrel, grooves 54 and 56 are cut on the outer side and the angles or tapers on edges 51A and 51B are cut. The sleeve is then removed from the mandrel and is of a size that slips over the cover 46 located around the valve base. Heat is then applied to sleeve 51 to shrink it, thereby reducing its diameter and uniformly squeezing the cover 46 into engagement with outside wall 26 of the valve housing 21.

Referring to FIG. 7, the cords 57 are then wrapped around sleeve 51. During wrapping, the cords are at substantially uniform tension so that even contracting force is applied to sleeve 51. The outer cords 57A and 57B are placed in their respective grooves 54 and 56 and tied to firmly hold the beads adjacent flanges 24 and 25.

Referring to FIG. 8, uncured core material 47 is placed around sleeve 51 and enclosed in the cover 46. The ends of the cover are turned inwardly and are secured together with continuous stitches 48. The uncured core material 47 can be formed into an elongated roll and uniformly placed around sleeve 51. The plastic core material 47, being uncured, is in a relatively pliable and malleable state so that it can be uniformly placed about sleeve 51. Preferably, a roll of uncured plastic material is weighed so that a determinant amount of plastic material can be placed within cover 46. The suturing member is now ready to be placed in the mold for shaping or forming.

As shown in FIG. 9, the valve 20 is located in the curing mold 59. The center portion of mold 59 has a chamber or cavity 61 for accommodating the valve. The upper portion of mold cavity 61 has an annular stepped groove 62. Groove 62 is part of the cavity 61 defined by generally upright circumferential surface or wall 63 and a generally horizontal surface or wall 64, providing the forming or shaping surfaces for the suturing member 27. Immediately adjacent the lower portion of surface 63 is an annular step 66 which forms a positioning stop for the valve base 21. Groove 62 of the mold 59 can have different shapes and sizes to form different types and styles of suturing members.

In the formation of suturing member 27 on the valve base 21, valve 20 is placed in chamber 61 with suturing member 27 pressed into the stepped groove or cavity 62. As the suturing member is moved into the cavity, its shape conforms to the mold groove 62 to form its outwardly directed peripheral flange portion. The suturing member 27 is positioned in groove 62 with a light force fit so that the inside of cover 46 is in continuous engagement with the plastic core 47. An annular member or ring 65 is placed over the suturing member 27. Ring 65 has a size and shape, as shown in FIG. 9, to form curved surface 50A when pressed into mold cavity 62. The entire valve structure and suturing member 27 are retained in mold cavity 61 with a flat cover or plate 67 which engages ring 65, holding it in firm engagement with surface 50A of suturing member 27.

Plastic core material 47 is cured by heating the mold for a period of time. During heating, sleeve 51 will further heat shrink and core material 47 will bond to the adjacent inside surface of cover 46. For example, with core material of "Silastic," the mold is heated in an oven for approximately 20 minutes at 250° F. Other temperatures and times are usable in accordance with the heat curing characteristics of the plastic. During the curing operation, plastic core material 47 does not flow into or penetrate the fabric of cover 46, whereby cover 46 retains its porous characteristics and its ability to receive tissue ingrowth.

After suturing member 27 is formed and cured, the valve 20 along with suturing member 27, is removed from mold 59. The relatively low curing temperature does not have any harmful effects on the material of the sleeve 51 or the material of the valve base 21 and disc 22.

The beads 52 and 53 of sleeve 51 firmly hold the cover 46 in engagement with the inside faces of flanges 24 and 25, thereby prohibiting undesirable flexing of the inner portions of the suturing member and separation of the suturing member from the valve base. The sleeve 51 places an even and substantially constant contraction or squeezing force on the inner portion of cover 46 that engages valve housing 21. This force is limited. The limits of the force are selected so that the valve housing can be rotated relative to the suturing member.

Referring to FIGS. 10 through 15, there is shown another method of making and assembling suturing member 127 on valve housing 121. As shown in FIGS. 10 and 11, cover 146 is a seamless cylindrical member or tube cut to a length determined by the type, size and shape of the suturing member. Cover 146 may be seamless tubular knitted or woven Dacron fabric or other biological inert materials having a mesh, spaces, or porosity enabling ingrowth of tissue soon after implantation. The seamless cover eliminates the side seam, shown adjacent stitches 58 in FIG. 5, thereby providing an even and continuous outer cover surface.

As shown in FIG. 12, double box stitches 149 are placed through the mid-portion of the cylindrical cover 146, with ends 149A and 149B extended on the outside of the cover.

Referring to FIG. 13, the seamless cover 146 is then placed about the valve housing 121. The mid-portion of cover 146 carrying stitches 149 is located approximately at the mid-point of outside wall 126. The ends 149A and 149B are pulled and tied together. Sleeve 151 is then slipped over the cover and located in the groove between flanges 124 and 125. The plastic sleeve 151 has a pre-shrunk size when it is placed over the cover 146. Sleeve 151 is a tubular member that is initially pre-shrunk on a cylindrical mandrel to a selected diameter. After the sleeve has been shrunk on the mandrel, grooves 154 and 156 are cut on the outer side and the angles or tapers on edges 151A and 151B are cut. The sleeve is then removed from the mandrel and is of a size that slips over the cover 146 located around the valve base. Heat is then applied to sleeve 151 to shrink it, thereby reducing its diameter and uniformly squeezing the cover 146 into engagement with outside wall 126 of the valve housing 121.

Referring to FIG. 14, the cords 157 are then wrapped around sleeve 151. During wrapping, the cords are at substantially uniform tension so that even contracting force is applied to sleeve 151. The outer cords 157A and 157B are placed in their respective grooves 154 and 156 and tied to firmly hold the beads adjacent flanges 124 and 125.

Referring to FIG. 15, uncured core material 147 is placed around sleeve 151 and enclosed in the cover 146. The ends of the cover are turned inwardly and are secured together with continuous stitches 148. The uncured core material 147 can be formed into an elongated roll and uniformly placed around sleeve 151. The plastic core material 147, being uncured, is in a relatively pliable and malleable state so that it can be uniformly placed about sleeve 151. Preferably, a roll of uncured plastic material is weighed so that a determinant amount of plastic material can be placed within cover 146. The suturing member is now ready to be placed in the mold for shaping or forming.

As shown in FIG. 16, the valve 120 is located in the curing mold 159. The center portion of mold 159 has a chamber or cavity 161 for accommodating the valve. The upper portion of mold cavity 161 has an annular stepped groove 162. Groove 162 is part of the cavity 161 defined by generally upright circumferential surface or wall 163 and a generally horizontal surface or wall 164, providing the forming or shaping surfaces for the suturing member 127. Immediately adjacent the lower portion of surface 163 is an annular step 166 which forms a positioning stop for the valve base 121. Groove 162 of the mold 159 can have different shapes and sizes to form different types and styles of suturing members.

In the formation of suturing member 127 on the valve base 121, valve 120 is placed in chamber 161 with suturing member 127 pressed into the stepped groove or cavity 162. As the suturing member is moved into the cavity, its shape conforms to the mold groove 162 to form its outwardly directed peripheral flange portion. The suturing member 127 is positioned in groove 162 with a light force fit so that the inside of cover 146 is in continuous engagement with the plastic core 147. An annular member or ring 165 is placed over the suturing member 127. Ring 165 has a size and shape, as shown in FIG. 16, to form curved surface 150A when pressed into mold cavity 162. The entire valve structure and suturing member 127 are retained in mold cavity 161 with a flat cover or plate 167 which engages ring 165, holding it in firm engagement with surface 150A of suturing member 127.

Plastic core material 147 is cured by heating the mold for a period of time. During heating, sleeve 151 will further heat shrink and core material 147 will bond to the adjacent inside surface of cover 146. For example, with core material of "Silastic," the mold is heated in an oven for approximately 20 minutes at 250° F. Other temperatures and times are usable in accordance with the heat curing characteristics of the plastic. During the curing operation, plastic core material 147 does not flow into or penetrate the fabric of cover 146, whereby cover 146 retains its porous characteristics and its ability to receive tissue ingrowth.

After suturing member 127 is formed and cured, the valve 120 along with suturing member 127, is removed from mold 159. The relatively low curing temperature does not have any harmful effects on the material of the sleeve 151 or the material of the valve base 121 and disc 122.

The beads 152 and 153 of sleeve 151 firmly hold the cover 146 in engagement with the inside faces of flanges 124 and 125, thereby prohibiting undesirable flexing of the inner portions of the suturing member and separation of the suturing member from the valve base. The sleeve 151 places an even and substantially constant contraction or squeezing force on the inner portion of cover 146 that engages valve housing 121. This force is limited. The limits of the force are selected so that the valve housing can be rotated relative to the suturing member.

I claim:

1. A suturing member mountable on a member having an outer annular wall and outwardly directed flanges forming an annular groove and connectable to tissues of a living creature comprising: cover means including porous material for accommodating live tissues to form a union between the suturing member and the tissues, a continuous sleeve of heat shrunk plastic material located around an inner portion of said cover means to hold the suturing member in the annular groove in engagement with the annular wall and flanges of the member, said sleeve having opposite end portions with means to accommodate contracting force applying means, means located around said sleeve to apply a continuous contracting force on the sleeve, said means including means cooperating with the means on the opposite end portions of the sleeve to force the end portions toward the flanges, and a core of cured plastic material located adjacent said sleeve and surrounded by said cover means.

2. The suturing member of claim 1 wherein: said core material has an outer surface secured to the inner surface of the cover means.

3. A suturing member connectable to tissues of a living creature comprising: cover means including porous material for accommodating live tissues to form a union between the member and the tissues, a sleeve of heat shrunk plastic material located around an inner portion of said cover means, cord means wrapped around said sleeve, and a core of cured plastic material located adjacent said sleeve and surrounded by said cover means, said sleeve having annular outwardly open grooves in the opposite end portions thereof, and continuous contracting means located in said grooves.

4. A suturing member connectable to tissues of a living creature comprising: cover means including porous material for accommodating live tissues to form a union between the member and the tissues, a sleeve of heat shrunk plastic material located around an inner portion of said cover means, cord means wrapped around said sleeve, and a core of cured plastic material located adjacent said sleeve and surrounded by said cover means, said sleeve having annular enlarged bead means on the opposite end portions thereof, said bead means having outwardly open groove means, means located in said groove means providing a contracting force on the opposite end portions of said sleeve, said cord means being located and confined to the space between said bead means.

5. A heart valve comprising: a valve base having spaced outwardly directed flanges and an outer wall between said flanges forming a groove, a valve member selectively movable relative to said base to open and closed positions, means holding the valve member in assembled relation with the base, a suturing member mounted on said base with a portion thereof located in said groove, said suturing member having cover means including porous material for accommodating live heart tissue to form a union between the suturing member and the heart tissue, a sleeve of heat shrunk material holding a section of said cover means in said groove and in uniform engagement with the flanges and outer wall of the base, said sleeve having opposite end portions with means to accommodate contracting force applying means, cord means around said sleeve providing a contracting and holding force on said sleeve, said cord means including means cooperating with the means on the opposite end portions of the sleeve to force the end portions toward the flanges, and a core of cured plastic material surrounding said sleeve and enclosed within said cover means.

6. The heart valve of claim 5 wherein: said core of plastic material is secured to the cover means and cord means.

7. A suturing member connectable to tissues of a living creature comprising: cover means including porous material for accommodating live tissues to form a union between the member and the tissues, a continuous annular sleeve of heat shrunk plastic material located around an inner portion of said cover means, said sleeve having annular outwardly open grooves in the opposite end portions thereof, and continuous contracting means located in said grooves, and cord means wrapped around said sleeve.

8. A heart valve comprising: a valve base, a valve member selectively movable relative to said base to open and closed positions, means holding the valve member in assembled relation with the base, a suturing member mounted on an outer portion of said base, said suturing member having cover means including porous material for accommodating live heart tissue to form a union between the suturing member and the heart tissue, a sleeve of heat shrunk material holding a section of said cover in engagement with the outer portion of the base, said sleeve having annular outwardly open grooves in the opposite end portions thereof, continuous contracting means located in said grooves, cord means around said sleeve providing a contracting and holding force on said sleeve, and a core of cured plastic material surrounding said sleeve and enclosed with said cover means.

9. A heart valve comprising: a valve base, a valve member selectively movable relative to said base to open and closed positions, means holding the valve member in assembled relation with the base, a suturing member mounted on the outer portion of said base, said suturing member having cover means including porous material for accommodating live tissue for form a union between the suturing member and the heart tissue, a sleeve of heat shrunk material holding a section of said cover in engagement with the outer portion of the base, said sleeve having annular enlarged bead means on the opposite end portions thereof, said bead means having outwardly open groove means, means located in said groove means providing a contracting force on the opposite end portions of said sleeve, cord means around said sleeve providing a contracting and holding force on said sleeve, said cord means being located and confined to the space between said bead means, and a core of cured plastic material surrounding said sleeve and enclosed within said cover means.

10. A suturing member connectable to tissues of a living creature comprising: means for accommodating live tissues to form a union between the member and the tissues, a continuous annular sleeve located around an inner portion of said means, said sleeve having opposite end portions, said end portions having means to accommodate means providing continuous contracting forces on said end portions, and means located around said sleeve providing a contracting and holding force on said sleeve, said means located around said sleeve including means cooperating with the means of the opposite end portions providing continuous contracting forces on said end portions.

11. The suturing member of claim 10 wherein: the end portions are enlarged beads having outwardly open groove means, said means cooperating with the end portions being located in said grooves.

12. The suturing member of claim 10 wherein: the means located around the sleeve comprise cord means wrapped around the sleeve.

13. The suturing member of claim 10 including: a core of plastic material surrounding the sleeve and enclosed with the means for accommodating live tissues.

14. A suturing member connectable to tissues of a living creature comprising: cover means including porous material for accommodating live tissues to form a union between the member and the tissues, a continuous annular sleeve of heat shrunk plastic material located around an inner portion of said cover means, said sleeve having annular enlarged bead means on the opposite end portions thereof, said bead means having outwardly open groove means, means located in said groove means providing a contracting force on the opposite end portions of said sleeve, and cord means wrapped around said sleeve, said cord means being located and confined to the space between said bead means.

15. A suturing member connectable to tissues of a living creature comprising: means for accommodating live tissues to form a union between the member and the tissues, a sleeve located around an inner portion of said means, means located about said sleeve to apply a continuous contracting force on said sleeve, said sleeve having outwardly open grooves in the opposite end portions thereof, and means located in said grooves applying a continuous force on said end portions.

16. The suturing member of claim 15 wherein: said sleeve has annular enlarged bead means on the opposite end portions thereof, said bead means having the outwardly open grooves.

17. A heart valve comprising: a valve base having a passage, an annular outer wall and outwardly directed flanges forming a groove with the outer wall, a valve member operable to open and close said passage, means holding the valve member in assembled relation with the valve base, a suturing member mounted on said base with a portion thereof located in said groove, said suturing member having means for accommodating live heart tissue, a sleeve having opposite end portions holding a section of said suturing member in said groove in uniform engagement with the outer wall and the flanges of the base, said end portions having means to accommodate means providing continuous contracting forces, means located around said sleeve applying a contracting and holding force on said sleeve, said means located around said sleeve including means cooperating with the means of the opposite end portions providing continuous contracting forces on said end portions.

18. The heart valve of claim 17 wherein: the end portions are enlarged beads having outwardly open groove means, said means cooperating with the end portions being located in said grooves.

19. The heart valve of claim 17 wherein: the means located around the sleeve comprise cord means wrapped around the sleeve.

20. The heart valve of claim 17 including: a core of plastic material surrounding the sleeve and enclosed with the means for accommodating live tissues.

21. The heart valve of claim 17 wherein: said sleeve has outwardly open grooves in the opposite end portions thereof, said means cooperating with the end portions being located in said grooves.

* * * * *

PO-1050
(5/69)

UNITED STATES PATENT OFFICE
CERTIFICATE OF CORRECTION

Patent No. 3,859,668          Dated   January 14, 1975

Inventor(s)   Lawrence Anderson

It is certified that error appears in the above-identified patent and that said Letters Patent are hereby corrected as shown below:

Column 1, line 45, "would" should be --wound--.

Column 2, line 55, "section" should be --sectional--.

Column 3, line 5, "device" should be --devices--.

Column 10, line 12, "materiall" should be --material--.

Signed and sealed this 3rd day of June 1975.

(SEAL)
Attest:

RUTH C. MASON
Attesting Officer

C. MARSHALL DANN
Commissioner of Patents
and Trademarks